358-86. XR 3,691,295 SR

United States Patent [15] 3,691,295

Fisk [45] Sept. 12, 1972

[54] TWO-WAY COMMUNICATION SYSTEM FOR VIDEO AND DIGITAL DATA

[72] Inventor: Dale E. Fisk, San Jose, Calif.

[73] Assignee: International Business Machines Corporation, Armonk, N.Y.

[22] Filed: March 31, 1970

[21] Appl. No.: 24,264

[52] U.S. Cl. ..........178/58, 179/2 TV, 178/DIG. 13, 325/22, 178/56

[51] Int. Cl. ..........H04l 5/14

[58] Field of Search........178/58, 59, 60, DIG. 3, 5.6; 343/175, 180; 340/172.5; 179/2 DP, 2 TV; 325/22, 21, 23

[56] References Cited

UNITED STATES PATENTS

| | | | |
|---|---|---|---|
| 3,566,032 | 2/1971 | Carbone | 178/59 |
| 3,566,031 | 2/1971 | Carbone | 178/59 |
| 3,105,877 | 10/1963 | Miller | 179/1 FS |
| 3,215,774 | 11/1965 | Ikegami | 178/5.6 |
| 2,978,538 | 4/1961 | Breese | 178/5.6 |
| 3,423,521 | 1/1969 | Friesen | 178/5.6 |

OTHER PUBLICATIONS

IBM Technical Disclosure " D.C. Duplexor Isberg & Rawson Vol. 5, No. 1 June 1962

Bell Laboratories Record p. 162- 168 May/June 1969 " Transmission Across Town or Across the Country" ; Nast

*Primary Examiner*—William C. Cooper
*Assistant Examiner*—Thomas D'Amico
*Attorney*—Hanifin and Jancin and Thomas A. Briody

[57] ABSTRACT

Transmission system for jointly linking a video source to a television display device, and a digital data source to a digital data output by means of a single coaxial cable. A video source and the digital data output are located at one end of the coaxial cable, with the television display device and digital data source located in the vicinity of the other end of the cable. Circuit arrangements are provided at the video source end of the cable, and also at the digital data source end of the cable, for respectively separating the video signal and the digital data signal from each other to thereby facilitate the transmission of video information in one direction through the coaxial cable while digital data is simultaneously transmitted through the cable in the other direction.

12 Claims, 1 Drawing Figure

Tx 5003

X 5001

Rm

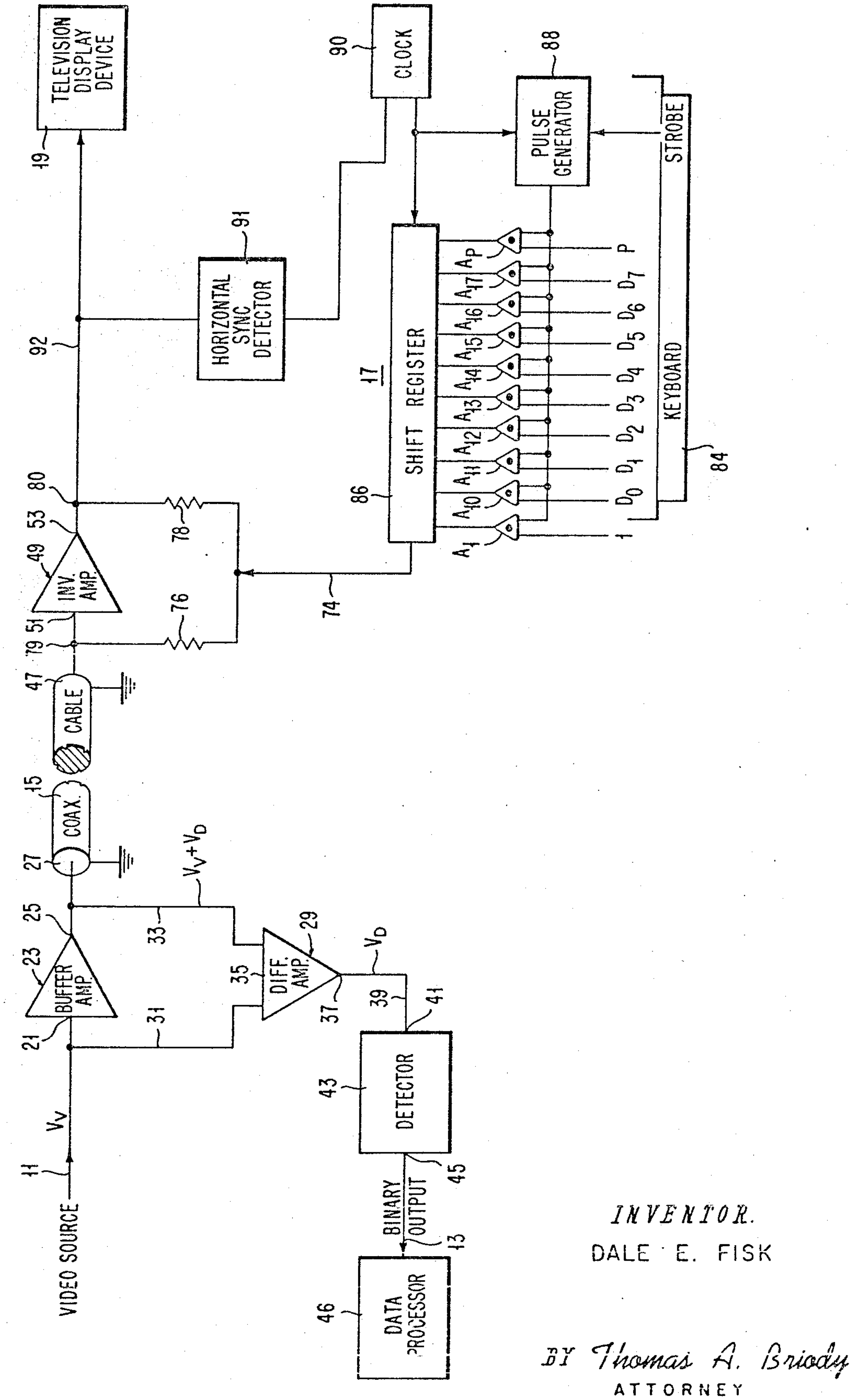
INVENTOR.
DALE E. FISK
BY Thomas A. Briody
ATTORNEY

TWO-WAY COMMUNICATION SYSTEM FOR VIDEO AND DIGITAL DATA

BACKGROUND OF THE INVENTION

1. Field of the Invention

This invention relates to a novel and improved system for transmitting television and digital data signals.

2. Description of the Prior Art

Data processing systems have become quite widespread in their applications. Such systems often have been described as an extension of man's capabilities, since they offer him an effective means for increasing his productivity in such widely divergent fields as banking, education, engineering, transportation and communication. In the operation and utilization of data processing systems, it often has been proven desirable to provide one or more display devices which serve as an output or outputs capable of visually displaying processor-generated video information. Such output devices also may include an input means for facilitating the exchange of information between human operators and information sources such as a data processor and retrieval system. One particular prior art system, known as an "image distribution system" provides a man-machine interface which is capable of displaying processor-generated information on a remote high resolution video monitor and modifying the display in accordance with the responses of the user. Such response might involve the sending of commands or new graphic data to the processor by the operator, as he watches a television or video monitor. In prior art systems of this type, it has been found necessary to install one coaxial cable for connecting the video source to the television monitor, and a plurality of separate conductors for connecting the digital source, usually located in the vicinity of the television monitor, to the digital data output (e.g. the processor). These separate transmission links have involved a considerable overall cost. Accordingly, it has been found desirable to provide a more simplified and inexpensive means for obtaining a communication linkage between (1) a video source and a television display device and (1) a digital data source and digital data output, located respectively, in proximity to the television display device and the video source.

SUMMARY OF THE INVENTION

An object of this invention is to provide a novel and improved two-way communication system which connects a video source to a television display device and a digital data source to a digital data output.

Another object of this invention is to provide a transmission link between a video source and a television display device which may also be used as a transmission link between a digital data source and a digital data output, for allowing the communication of video information in one direction through the link, while digital data may be simultaneously communicated through the same link in another direction.

A further object of my invention is to provide a two-way communication system for an information processing and display device, which is both simplified in construction and low in cost.

In carrying out my invention, in my form thereof, I apply it to a data processing and video display communication system which includes a video signal source and a television display device substantially spaced therefrom. In the vicinity of the video signal source, a digital data output (e.g. a data processor) is located, and near the television display device, a digital data source (e.g. a keyboard operated digital data source) is arranged. With such an arrangement, the video signal source is connected to an adjacent end of a coaxial cable, through a buffer amplifier. The other end of the coaxial cable is connected to an adjacent television display device through an inverting amplifier, thereby completing a video transmission circuit.

The digital voltage source is linked to the television display end of the coaxial cable by connecting it to the input and output sides of the inverting amplifier, respectively, through a pair of predetermined parallel impedances. By proportioning one of the parallel impedances relative to the coaxial cable impedance, proportioning the other parallel impedance relative to the output impedance of the inverting amplifier and the input impedance of the television display device, and adjusting the gain of the inverting amplifier, the digital voltage may be effectively cancelled on the output side of the inverting amplifier. On the video source side of the coaxial cable, the input and output sides of the buffer amplifier are connected to the inputs of a differential amplifier. The output of the differential amplifier is in turn detected and coupled to tee digital data output. The differential amplifier serves to subtract the video signal from the digital data signal, to thereby provide a digital data signal which is transmitted via the coaxial cable, from the digital data source to the digital data output, for completing the digital data transmission circuit. Such an arrangement provides a simplified and low cost technique for transmitting digital information in one direction over a single coaxial cable, while allowing a television signal, either live or recorded, to be transmitted in the other direction.

BRIEF DESCRIPTION OF DRAWING

The foregoing and other objects, features and advantages of the invention will be apparent from the following more particular description of a preferred embodiment of the invention, which is illustrated in the accompanying drawing. This drawing represents a partially schematic block diagram of a two-way communication system for simultaneously transmitting video and digital data signals, in opposite directions, in accordance with my invention.

DESCRIPTION OF PREFERRED EMBODIMENT

As shown in the drawing, a video source 11 and digital data output 13 are connected to one side of a coaxial cable 15, and a digital data source 17, together with a television display device 19, are connected to the other side of the coaxial cable 15.

It will be understood by those skilled in the art that the video source 11 and digital data output 13 may preferably be disposed very close together, such as for example, alongside of each other in the same processing room. The coaxial cable may be of any desired length and construction (e.g. 2,000 feet and 75 ohms), which is suitable for extension between a data processing facility and a remotely located television display/keyboard device. It will be further understood that the television display device 19 and the digital data source 17 might be located very close together, such as alongside of each other in one facility area, or as part of the same physical unit.

The video signal may be provided by a video buffer, television camera, cable or broadcast television receiver (not shown), or the like, having frequency characteristics in the order of between 30 hertz and 20 mega-hertz.

In accordance with the illustrative embodiment of my invention, the video source 11 is connected to the input side 21 of a buffer amplifier 23. The output side 25 of this buffer amplifier is connected to the video transmission end 27 of the aforementioned coaxial cable 15. Buffer amplifier 23 is a non-inverting amplifier which has a finite output impedance and is capable of isolating the video signal source voltage form other voltages present at end 27 of the coaxial cable 15. Thus, at the input 21 of buffer amplifier 23, a voltage $V_v$ representative of the video source voltage, is present. At the output 25 of the buffer amplifier 23, a voltage $V_v + V_d$ is present, with $V_d$ representing a voltage introduced by the digital data source 17 at the other end of the coaxial cable 15.

In the exemplary embodiment of my invention herein described, the buffer amplifier 23 also functions as a line driver for sending video signals through the coaxial cable 15, and it has a typical gain of +1. For separating out, at the video transmission end of cable 15, the digital data voltage $V_d$ from the summation of the video signal voltage and data voltage, $V_v + V_d$, I have provided a differential amplifier 29, which is connected to the input side 21 and output side 25 of the buffer amplifier 23, by means of conductors 31 and 33, respectively. The conductors 31 and 33 respectively present the $V_v$ signal and the $V_v + V_d$ signal to the input side 35 of differential amplifier 29. The differential amplifier 29 is of such a design as to compare $V_v + V_d$ with $V_v$, for producing, at its output 37, the digital data voltage $V_d$. To help purify the data voltage at the output 37 of differential amplifier 29, the digital data voltage $V_d$ is fed via conductor 39 to the input side 41 of a detector 43. Detector 43 performs the function of averaging out variations in the output data voltage signal of amplifier 29, which have been caused by extraneous video signals. Such signals may result from inherent finite delay of video voltages passing through the isolation amplifier 23. The output 45 of the detector 43 is connected to the digital data output 13, which is linked to a data processor 46. It will be understood by those skilled in the art that the functions of differential amplifier 29 and detector 43 could be combined in an appropriately designed differential detector amplifier.

Turning now to a description of the circuitry present on the other side 47 of the coaxial cable 15, it will be noted that this other side 47 is connected through an inverting amplifier 49 to the television display device 19. The inverting amplifier 49 forms an important aspect of the present invention, since it functions to help isolate the digital data voltage $V_d$ from the television display device 19.

More particularly, the digital data transmission end 47 of the coaxial cable is connected to the input side 51 of inverting amplifier 49, and the output side 53 of the inverting amplifier is connected to the television display device 19. It is important that the inverting amplifier 49 have a finite input impedance and a finite output impedance. For most practical applications of my invention, this should pose no problem, since a transmission line and television receiver are usually designed for termination by specific resistances of either 75 ohms or 300 ohms. Most coaxial cables used for video signal transmission are characterized by a 75 ohm termination requirement. The inverting amplifier 49 is designed for cancellation of digital voltage $V_d$ at its output side 53, as will be further understood hereinafter, and for this purpose, in the inventive embodiment described herein, it has been assigned a gain of −2.

For effectively cooperating with the inverting amplifier 49, to cancel out any digital data voltage $V_d$ at the television display device 19, in accordance with my invention, the output of the digital data source 17 is fed by conductor 74 to a pair of parallel impedances 76, and 78, which are connected respectively via points 79 and 80 to the input 51 and output 53 of the inverting amplifier 49. Impedance 76 functions to provide a voltage divider network with the impedance of the coaxial cable 15, and is preferably equal to the impedance of the coaxial cable 15. Thus, for a cable 15 having an impedance of 75 ohms, the impedance 76 would be equal to 75 ohms.

Impedance 78 forms a voltage divider network with the output impedance of the inverting amplifier 49, and is preferably equal to the output impedance of the inverting amplifier 49, and twice the input impedance of the television display device. Thus, for a television display device input impedance of 75 ohms, and an output impedance of the inverting amplifier of 150 ohms, the impedance 78 equals 150 ohms.

Since the impedance 76 is 75 ohms, and the impedance of the coaxial cable is 75 ohms, for the illustrative embodiment shown in the drawing, the digital data voltage $V_d$ on the conductor 74 is divided so that a positive component of the digital data voltage $V_d$ is produced at point 79.

Since the impedance 78 is 150 ohms, the output impedance of the inverting amplifier is also 150 ohms, and the input impedance of the television display device is 75 ohms, for the illustrative embodiment, the result at point 80 is the production of a cancellation effect with respect to $V_d$. More particularly, the voltage is divided by impedance 78 and the inverting amplifier output impedance so that at point 80, the difference between the output of inverting amplifier 49 and the digital data voltage $V_d$ is formed. In view of the appropriate proportioning of the impedances 76 and 78, respectively, in relationship to the coaxial cable impedance on the one hand, and the output impedance of the inverting amplifier and input impedance of the television display device, on the other hand, an effective means has thereby been achieved for cancelling out any significant effect of digital data voltage $V_d$ at the television display device 19.

The digital data source 17 is intended to show an exemplary embodiment for keyboard 84, where digital data originating in parallel from the keyboard, is serialized in a 10-bit shift register 86 and used for the data source. Digital data coming from the keyboard 84 consists of ten lines, a strobe line and nine data lines consisting of a parity bit P, and eight binary data bits $D_0$ and $D_{1-7}$. When a key is depressed on the keyboard 84, the strobe line is selected and some combination of data bits is selected along with its associated parity indication. The strobe line from the keyboard is detected by a pulse generator 88, which in conjunction with a clock 90, opens up a series of ten AND gates $A_1$, $A_{10}$,$A_{11}$–$A_{17}$ and $A_P$, to cause the keyboard data output to be loaded in a parallel fashion into the 10-bit shift register 86. Thus, the pulse generator 88 upon detecting a strobe output from the keyboard 84, causes the parallel keyboard data to be loaded into the shift register 86 in parallel. The clock 90 then causes the shift register data to be transmitted from the digital data source 17 to conductor 74 and to branched impedances 76, 78. It will thus be understood that the keyboard 84 effectively provides a digital data source for the overall two-way communication system of the present invention.

To provide horizontal synchronization of the television raster obtained at the television display device 19, in consonance with the synchronous operation of the keyboard operated digital data source 17, clock 90 is connected by way of a horizontal sync detector 91 to conductor 92, which serves as an input to the television display device 19.

Turning now to a description of the overall operation of my improved two-way communication system for video and digital data, a video source voltage $V_v$ is fed to the input 21 of buffer amplifier 23. Amplifier 23 functions as a line driver for sending the video signal through coaxial cable 15, to the input 51 of inverting amplifier 49. From the output 53 of the inverting amplifier 49, the video voltage is fed through conductor 92 to the television display device 19.

For eliminating any interference of digital data voltage to the communication link established between video source 11 and the television display device 19, the buffer amplifier 23 functions to prevent feedback of digital data voltage variations from the coaxial cable 15 toward the video source 11; and the inverting amplifier 49 together with the proportioned impedances 76, and 78 function to cancel the deleterious effects of any digital data voltage $V_d$ in conductor 92 at the television display device end of the link.

The digital data voltage $V_d$, emanating form the shift register 86, at source 17, is fed through resistor 76 and coaxial cable 15, via conductor 33 to the differential amplifier 29. The differential amplifier 29 subtracts the video voltage from the summation of the digital and video voltages. The digital voltage then passes through detector 43 to the data processor 46.

The digital data source may be assumed to be a perfect voltage source having an impedance considerably lower than 75 ohms. The data sequence, for the disclosed keyboard operated digital data source, is as follows:

1 Start Pulse
$D_0$ Data Bit 0
$D_1$ Data Bit 1
$D_2$ Data Bit 2
$D_3$ Data Bit 3
$D_4$ Data Bit 4
$D_5$ Data Bit 5
$D_6$ Data Bit 6
$D_7$ Data Bit 7
P Parity Bit An important advantage of the present invention is that it allows the use of a television set as a display terminal for a video source, while also allowing the terminal operator to communicate data back to a central computer, by using only a single coaxial cable. From a practical standpoint, the cancellation of digital data voltage at the television display device 19 does not have a high tolerance requirement. By synchronizing the digital data to the horizontal line frequency of the television display device 19 (e.g. a bit rate of about 15 kbps.), and changing from one bit to the next during the time that a horizontal sync pulse is present, it is thereby possible to minimize the effect of switching transients, since the television display device is least sensitive to them at this time. In addition, since for a brief interval after each horizontal sync pulse, a time period is reserved for establishing a "reference black level" for the following horizontal line of video, the television display device tends to correct any lack of precision in the adjustment of the impedances 76 and 78 by varying the "reference black level" to compensate for this lack of precision.

It will now therefore be seen that the new and improved two-way communication system heretofore described is simplified in structure, efficient in operation, and very low in cost. It effectively facilitates the superimposition of digital data on a video signal carrying coaxial cable, to allow two-way communication of digital data and video signals, without changing the appearance of a television display.

While in accordance with the Patent Statutes, I have described what at present is considered to be the preferred aspect of this invention, it will be obvious to those skilled in the art that various changes or modifications may be made therein without departing from the present invention.

What I claim is:

1. A two-way communications system, comprising:

a video signal source;

a television display device substantially spaced apart from said video signal source;

a digital data source;

a digital data output;

and communication means including a single transmission link in the form of a coaxial cable for jointly and directly connecting said video signal source to said display device, and said digital data source to said data output;

said transmission line having one of its ends connected to said video signal source and said digital data output;

the other end of said transmission line being connected to said television display device and said digital data source;

said communication means including a first circuit for cancelling video signal voltage at said digital data output and a second circuit for cancelling digital data voltage at said television display device;

said first cancellation circuit of said communication means including a buffer amplifier connected between said video source and said one end of said line, and said second cancellation circuit comprising an inverting amplifier connected between said other end of said line and said television display device;

whereby said single transmission line provides a two-way communication link between a video source/digital data output and a television display device/digital data source which allows the transmission of video analog information in one direction while binary information is simultaneously transmitted through the link in the other direction.

2. The communications system of claim 1 wherein said inverting amplifier has a finite input impedance and a finite output impedance, said digital data source is connected through a first impedance to the input of said inverting amplifier, and said digital data source is also connected through a second impedance to the output of said inverting amplifier, said first and second impedances being proportioned relative to the gain of the inverting amplifier and the impedances of the line transmission cable, inverting amplifier and television display device to cancel any digital data voltage at the input of said television display device.

3. The communications system of claim 2 wherein said first cancellation circuit comprises a differential amplifier having two input leads and an output lead, said two input leads of said differential amplifier being connected across said buffer amplifier to subtract video voltage from the summation of video voltage and digital voltage thereby to provide a digital voltage signal at the output lead for connection to said digital data output.

4. The communication system of claim 3 wherein said video signal source emanates from a video buffer, the digital data source is produced by a keyboard operated data input device, and said digital data output is fed to a data processor unit.

5. A two way communications system comprising:

a video signal source;

a television display device;

means for directly transmitting video signals in a first direction from said video signal source to said television display device, said video signal transmission means including a singular transmission line unit, an isolation means connected between said video signal source and a first end of said transmission line unit, and an inverting amplifier connected between a second end of said transmission line unit and said television display device;

a digital data source;

a digital data output;

means for transmitting digital data signals in a second direction opposite to said first direction, from said digital data source to said digital data output, said digital data transmission means including said singular transmission unit, circuit means including the connection of said digital data source through a first impedance to said second end of said transmission line unit, and through a second impedance to the output side of said inverting amplifier for cancelling any digital data voltage between said inverting amplifier and said television display device, and differential amplifier means having its inputs connected across said isolation means for subtracting the video signal from said digital data signal to provide a digital data voltage for said digital data output;

whereby said transmission line unit serves as a single communication link between said video source and said digital data source for transmitting video analog information in one direction while binary data is simultaneously transmitted in the other direction.

6. The two-way communications system of claim 5 wherein said isolation means is a buffer amplifier having its input connected to said video signal source and its output connected to the first end of said transmission line unit.

7. The two-way communications system of claim 5 wherein said transmission line unit is a single coaxial cable having its outer shield grounded at each end.

8. The communications system of claim 5 wherein the video signal source is provided by a video buffer, the digital data source is provided by a keyboard operated data input device located in contiguity with said television display device, and said digital data output is connected to a data processor unit.

9. The communications system of claim 7 wherein the inverting amplifier has a finite input impedance and a finite output impedance, said digital data source being connected through the first impedance to the input of said inverting amplifier, said first impedance having a predetermined relationship to the impedance of said coaxial cable, said digital data source being also connected through the second impedance to the output of said inverting amplifier, said second impedance having a predetermined relationship to the output impedance of said inverting amplifier and the input impedance of said television display device.

10. The communications system of claim 9 wherein the digital data source is a keyboard operated data input device located in proximity to the television display device and said data output is a data processor unit.

11. A two-way communications system, comprising:

a video signal source;

a television display device substantially spaced apart form said video signal source;

a digital data source;

a digital data output;

and communication means including a single transmission line for jointly and directly connecting said video signal source to said display device, and said digital data source to said data output;

said transmission line having one of its ends connected to said video signal source and said digital data output;

the other end of said transmission line being connected to said television display device and said digital data source;

said communication means including a first circuit means for cancelling video signal voltage at said digital data output and a second circuit means for cancelling digital data voltage at said television display device;

said first cancellation circuit means including a buffer amplifier connected between said video source and said one end of said line; and said second cancellation circuit including an inverting amplifier coupled to said other end of said line;

whereby said single transmission line provides a two-way communication link between source/digital video soruce/digital data output and a television display device/digital data source which allows the transmission of video analog information in one direction while binary information is simultaneously transmitted through the link in the other direction.

12. The communications system of claim 11 wherein the digital data source is located in the vicinity of said television display device and the digital data output is located in the vicinity of said video signal source.

* * * * *